(12) United States Patent
Gehringer et al.

(10) Patent No.: US 11,386,316 B2
(45) Date of Patent: Jul. 12, 2022

(54) DEVICE AND METHOD FOR TRANSMITTING AND RECEIVING DATA OF A PASSIVE RFID TAG IN AN ELECTROMAGNETICALLY SHIELDED HOUSING

(71) Applicant: ebm-papst Mulfingen GmbH & Co. KG, Mulfingen (DE)

(72) Inventors: Jan Gehringer, Rothenburg o.d. Tauber (DE); Markus Humm, Weißbach (DE); Sebastian Schroth, Kupferzell (DE); Ralph Wystup, Künzelsau (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 147 days.

(21) Appl. No.: 16/763,879

(22) PCT Filed: May 14, 2019

(86) PCT No.: PCT/EP2019/062386
§ 371 (c)(1),
(2) Date: May 13, 2020

(87) PCT Pub. No.: WO2019/224057
PCT Pub. Date: Nov. 28, 2019

(65) Prior Publication Data
US 2021/0374498 A1 Dec. 2, 2021

(30) Foreign Application Priority Data

May 25, 2018 (DE) .......................... 102018112570.4

(51) Int. Cl.
*G06K 19/077* (2006.01)

(52) U.S. Cl.
CPC . *G06K 19/07794* (2013.01); *G06K 19/07783* (2013.01)

(58) Field of Classification Search
USPC ................. 235/492; 340/572.1, 572.7, 572.8
See application file for complete search history.

(56) References Cited

U.S. PATENT DOCUMENTS

| 7,421,245 B2 * | 9/2008 | Lieffort | ................... H01Q 7/00 455/41.1 |
| 2007/0001809 A1 * | 1/2007 | Kodukula | .......... G06K 7/10346 340/10.1 |

(Continued)

FOREIGN PATENT DOCUMENTS

| EP | 1701296 | 9/2006 |
| EP | 2733787 | 5/2014 |

OTHER PUBLICATIONS

German International Search Report and Written Opinion dated Aug. 16, 2019.

*Primary Examiner* — Suezu Ellis
(74) *Attorney, Agent, or Firm* — Dickinson Wright PLLC

(57) ABSTRACT

A device for wirelessly transmitting and receiving data of an RFID tag introduced in an electromagnetically shielded housing, wherein a transmission region is provided in the housing wall of the housing and wherein a transceiver is connected to the RFID tag. The transceiver is configured to transmit and/or receive data from the RFID tag through the transmission region, wherein a double coil formed by two coil assemblies is provided directly above or below the transmission region for coupling to an external receiving unit of a reading device and for coupling to the transceiver.

18 Claims, 2 Drawing Sheets

(56) References Cited

U.S. PATENT DOCUMENTS

| | | | |
|---|---|---|---|
| 2007/0222602 A1 | 9/2007 | Luo et al. | |
| 2010/0109841 A1* | 5/2010 | Yamada | G06K 7/10178 340/10.1 |
| 2017/0286903 A1* | 10/2017 | Elizondo, II | H04B 17/318 |
| 2018/0025266 A1* | 1/2018 | Sakurai | G06K 7/10316 340/10.1 |

* cited by examiner

DEVICE AND METHOD FOR TRANSMITTING AND RECEIVING DATA OF A PASSIVE RFID TAG IN AN ELECTROMAGNETICALLY SHIELDED HOUSING

RELATED APPLICATIONS

This application claims priority to German Patent Application No. 10 2018 112 570.4, filed May 25, 2018, and PCT/EP2019/062386, filed May 14, 2019, the entire contents of which are incorporated herein by reference in their entirety.

FIELD

The disclosure relates to a device and a method for transmitting and receiving of data of a, particularly passive, RFID tag or RFID memory chip which is accommodated in a shielded housing.

BACKGROUND

The disclosure particularly relates to so-called NFC tags in a housing. NFC tags are passive RFID tags which typically operate in the 13.56 Mhz high-frequency range. The specifications for frequency range, modulation, and data structure on the microchip are determined by a standardization organization named NFC Forum. NFC tags, for example in the form of decals, key rings, cards, or wristbands contain a microchip which can store a specific amount of data. The NFC tag can be read using a NFC terminal, for example a mobile phone. But NFC tags can only store a small amount of data. This amount of data, however, is sufficient for storing a unique ID or the like.

When data stored on a RFID memory chip disposed in a shielded housing is transmitted wirelessly, we have found in practice that the surrounding housing walls and, first and foremost, the shielding effect of metallic housings interfere with data transmission, prevent it completely, or only let weak (short-range) signals pass. The relevant prior art does not provide a satisfactory solution to transmit or receive data with sufficient signal strength through a shielded housing.

BRIEF SUMMARY

In this context, it is the problem of the present disclosure to overcome the disadvantages mentioned above and to provide a device and a method for transmitting and receiving data of a, particularly passive, RFID tag or RFID memory chip accommodated in a shielded housing, wherein the device can be operated in an inexpensive, secure, and also for a longer period reliable manner.

This problem is solved by a device having the features of claim 1 and a method having the features of claim 11.

A first basic concept of the present disclosure relates to the aspect to create at least one region with a low shielding effect (hereinafter: transmission region) on the shielded housing or even to provide a transmission opening. Preferably, two or more of such (same or different) transmission openings or transmission regions can be provided in the housing.

Another concept of the present disclosure is to achieve a specific directional effect of an electromagnetic flow generated in a transmitting/receiving unit for the transmitting and receiving process and to guide this electromagnetic flow in a targeted manner through the transmission region or the transmission opening provided.

According to the disclosure, two coil bodies coupled to each other are positioned in the housing and/or coupled in such a manner that the transmission region provided in the housing can be penetrated by the electromagnetic fields generated to ensure communication between a reader (e.g. a smartphone) and the RFID transponder.

In an advantageous embodiment of the disclosure, the two coil bodies are arranged relative to each other for coupling with the reading device and the RFID tag. It is particularly envisaged that the two coils form a type of "magnetic lens" to conduct the electromagnetic signals in a focused manner through the transmission region.

In a preferred embodiment of the disclosure, a solution is proposed wherein the housing is configured as a shielded housing, preferably as a metallic housing, e.g. of a motor. Preferably, the two coil bodies can be disposed in the terminal box or under the lid of an inverter housing disposed on the motor in such a manner that the electromagnetic flow is oriented towards the recesses provided in the motor terminal box and the recesses serve as transmission openings. Since a motor terminal box typically has such recesses as passages for electric feed lines, such that, in a special embodiment of the disclosure, the orientation of the electromagnetic flux and of the magnetic flux effect achieved by the two coil bodies is directed at least at one of the recesses provided in the terminal box.

According to the disclosure, a device is proposed for wirelessly transmitting and receiving data of an RFID tag introduced in an electromagnetically shielded housing, wherein a transmission region is provided in the housing wall of the housing and wherein a transceiver connected to the RFID tag is also provided, which transceiver is configured to transmit and/or receive data from the RFID tag through the transmission region, wherein a double coil formed by two coil assemblies is provided directly above or below the transmission region for coupling to an external receiving unit of an external reading device and for coupling to the transceiver. The transceiver can for example be a choke, a rod core choke, an inductance, or the like.

In a particularly preferred embodiment of the disclosure, the transmission region is a transmission opening in the form of a recess of the housing wall or a region having a significantly lower shielding attenuation than the surrounding housing, preferably a shielding attenuation which is by a factor of 0.5 lower than the shielding attenuation in the area of the housing wall immediately surrounding the transmission region or the remaining housing wall of the housing. The transmission opening or transmission region, respectively, can for example be configured as a housing cutout, a grid-like structure having a plurality of cutouts in the housing wall in this region, or a material selected for its weak or non-shielding properties in the region of the housing wall. It would be conceivable, for example, to also provide an opening in the otherwise closed housing wall, into which a plastic lid or a plastic inlay is inserted which is permeable to electromagnetic radiation. In this manner, the housing still provides complete protection against, for example, environmental influences and at the same time ensures a functioning EMC shielding.

In another preferred embodiment of the disclosure, the transceiver is formed with a rod core choke or a ferrite core with a coil assembly surrounding the same, which is further preferably disposed below the transmission region in the housing and adequately oriented, wherein the coil assembly is preferably further connected in series or in parallel to the RFID tag via a resonance circuit or an impedance for tuning the resonance of the transmitter unit configured in the device.

It is likewise advantageous if the coil assembly is connected in series or in parallel to the RFID tag via a resonance circuit or an impedance for tuning the resonance to a receiving system. In this way, the resonance frequencies of the resonant circuits of the transmitting antennas and receiving antennas can be adequately tuned to each other.

In another advantageous embodiment of the present disclosure, the double coil from the two coil assemblies is configured such that the one coil assembly is wound as an outer coil assembly in the same winding plane around the second coil assembly, wherein the second coil assembly is therefore configured as an inner coil assembly. Advantageously, the inner coil assembly and the outer coil assembly are wound or formed from a common coil wire, such that the two coil assemblies are connected in series electrically and arranged coaxially to each other spatially.

In a favorable embodiment, the double coil formed thereof is disposed on or in a flat coil carrier in a substantially common plane.

It is an advantage if the coil carrier is disposed above the transmission region and if further preferably the transceiver or its coil is disposed directly below the transmission region. This results in a good electromagnetic coupling out of the shielding housing if the magnetic flux in the respective coupled coils has the same orientation.

Another aspect of the present disclosure relates to a method for wirelessly transmitting and receiving data of an RFID tag introduced in an electromagnetically shielded housing to an external receiving unit, particularly to a receiving unit disposed outside of the housing, using a device as described above and comprising the following steps:

electromagnetic coupling between a coil of the transceiver and the double coil, particularly the inner coil assembly of the double coil, and electromagnetic coupling between the double coil, particularly the outer coil assembly, and an external receiving unit for transmitting data to the receiving unit and/or receiving data from the receiving unit.

It is particularly advantageous if the receiving unit (for example a receiving unit integrated in a mobile phone) is positioned above the housing for transmitting and/or receiving data for a particularly efficient coupling with the receiving coil of the receiving unit.

BRIEF DESCRIPTION OF THE DRAWINGS

Other advantageous further developments of the disclosure are characterized in the dependent claims or are explained in more detail below with reference to the figures and together with preferred embodiments of the disclosure.

Wherein.

DETAILED DESCRIPTION

Figure 1:
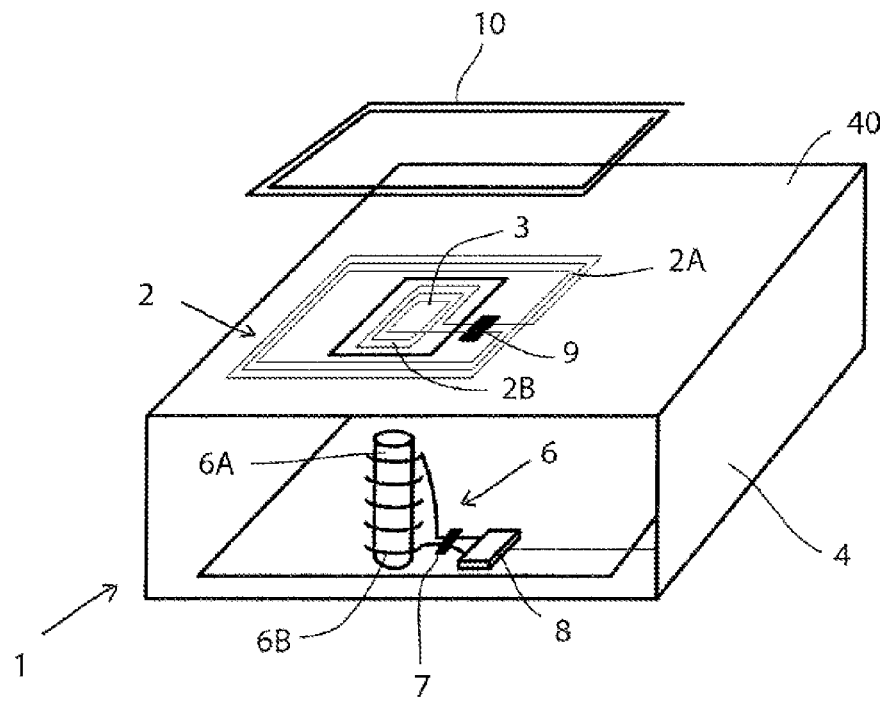
FIG. 1 is a schematic perspective view of a device according to the disclosure.

The disclosure is described below based on preferred embodiments with reference to FIGS. 1 to 3, wherein the same reference numerals indicate same structural and/or functional features.

FIG. 1 shows a schematic view of an exemplary device 1 according to the disclosure, which is configured for wirelessly transmitting and receiving data of the RFID tag 8 which is introduced in the electromagnetically shielded housing 4.

The housing 4 is a closed housing that has housing walls 40 on all sides. A transmission region 3 is provided in the housing wall 40 of the housing 4. The transmission region 3 is in this case an opening in the housing wall. Furthermore, a transceiver 6 connected to the RFID tag 8 is provided.

The transceiver is configured to transmit and/or receive the data stored on the RFID tag through the transmission region 3, that is, out of or into the shielded housing 4.

To this end, a double coil 2 formed of the two coil assemblies 2A, 2B shown is provided above the transmission region 3 for coupling to an external receiving unit 10 of a reading device and for coupling to the transceiver 6. The receiving unit 10 shown can for example be integrated in a smartphone having suitable software for processing the data.

Figure 2:
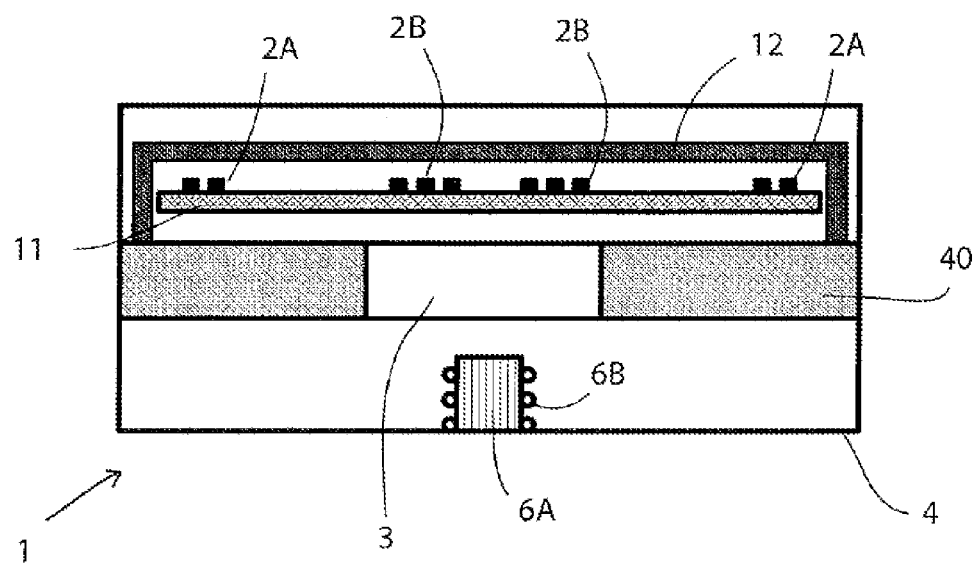
FIG. 2 is a sectional view through the view according to an alternative embodiment in which additionally a housing lid is provided.

The transceiver 6 shown in FIGS. 1 and 2 is configured with a rod core choke 6A. A cylindrical coil assembly 6B is wound around the rod core choke 6A. As can be seen in FIGS. 1-3, the respective coil openings of the coils 2A, 2B (the double coil 2) of the coil arrangement 6B, and the coil of the receiving unit 10 (e.g. a receiving coil) are each oriented such that the magnetic flux flows substantially vertically, thereby penetrating the coil openings (parallel to the coil axis). The double coil 2 consists of the two coil assemblies 2A, 2B, which are wound from a common coil wire, wherein the one coil assembly 2A (schematically of 2 coil windings) is wound as outer coil assembly in the same winding plane around the second coil assembly 2B (schematically consisting of 3 coil windings), wherein the second coil assembly 2B is configured as inner coil assembly. The double coil 2 is disposed on a flat coil carrier 11, which is located above the transmission opening 3.

The transceiver 6 is disposed directly below the transmission region 3.

Figure 3:
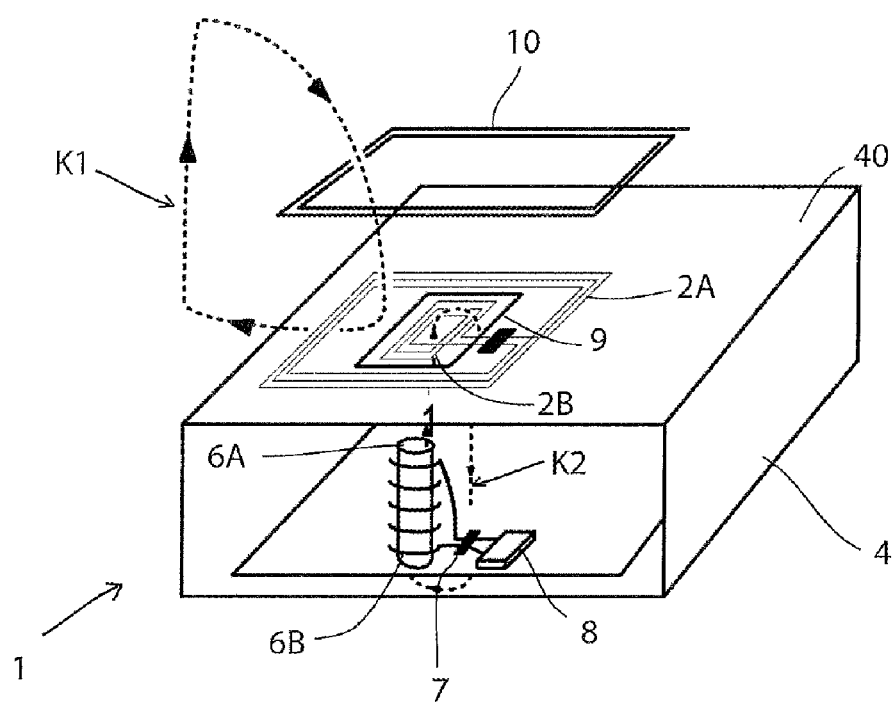
FIG. 3 is a view similar to FIG. 1, showing one magnetic flux coil each for coupling the coil assemblies.

Furthermore, it can be seen in FIGS. 1 and 3 that the coil assembly 6B of the transmitting device is connected in series or in parallel via a resonance circuit 7 to the RFID tag 8 for tuning the resonance to a receiving system.

The double coil 2, i.e. the coil assemblies 2A, 2B, are connected in series or in parallel via a resonance circuit 9 to the RFID tag 8 fortuning the resonance of the transmitting unit formed in the device. In FIG. 2, a lid 12 is attached above the coil carrier 11, which lid has an unshielded design and is preferably made of a completely non-conductive material.

FIG. 3 schematically shows an electromagnetic coupling K1, which shows the magnetic field for symbolizing the coupling between the RFID reading device (for example a smartphone) and the double coil 2. The coupling K2 is likewise shown schematically and represents the bundled magnetic field (field line) generated by the coil assembly of the electromagnetic coupling generated between the coil assembly and the rod core choke 6 by its coil 6B.

The implementation of the disclosure is not limited to the preferred embodiments described above.

The invention claimed is:

1. A device for wirelessly transmitting and receiving data of a radio frequency identification (RFID) tag positioned in an electromagnetically shielded housing, wherein a transmission region is provided in a housing wall of the housing and wherein a transceiver connected to the RFID tag is also provided, wherein the transceiver is configured to transmit and/or receive data from the RFID tag through the transmission region, wherein a double coil formed by two coil assemblies is provided directly above or below the transmission region for coupling to an external receiving unit of an external reading device and for coupling to the transceiver.

2. The device according to claim 1, wherein the transceiver is configured with a rod core choke or a ferrite core with a coil assembly surrounding the rod core choke or the ferrite core.

3. The device according to claim 2, wherein the coil assembly surrounding the rod core choke or the ferrite core is connected in series or in parallel to the RFID tag via a resonance circuit or an impedance for tuning the resonance to a receiving system.

4. The device according claim 1, wherein the double coil is configured such that the first coil assembly is wound as an outer coil assembly in a same winding plane around a second coil assembly, wherein the second coil assembly is configured as an inner coil assembly.

5. The device according to claim 4, wherein the inner coil assembly and the outer coil assembly are wound or formed from a common coil wire.

6. The device according to claim 1, wherein the two coil assemblies are connected in series or in parallel to the RFID tag via a resonance circuit or an impedance for tuning the resonance of the transmitting unit configured in the device.

7. The device according to claim 1, wherein the double coil is disposed on or in a flat coil carrier.

8. The device according to claim 7, wherein the coil carrier is disposed above the transmission region.

9. The device according to claim 1, wherein the transceiver is disposed directly below the transmission region.

10. The device according to claim 1, wherein the transmission region is a transmission opening in the form of a recess in the housing wall having a lower shielding attenuation than a surrounding housing.

11. The device according to claim 1, wherein the transmission region is in the form of a region having a lower shielding attenuation than a surrounding housing of the electromagnetically shielded housing.

12. The device according to claim 11, wherein the shielding attenuation in the transmission region is reduced by a factor of 0.5.

13. The device according to claim 11, wherein the shielding attenuation in the transmission region is less than a shielding attenuation in an area of the housing wall immediately surrounding the transmission region.

14. The device according to claim 11, wherein the shielding attenuation in the transmission region is less than a shielding attenuation in a remainder of the surrounding housing.

15. A method for wirelessly transmitting and receiving data of an RFID tag positioned in an electromagnetically shielded housing to an external receiving unit disposed outside of the housing, using the device of claim 1, comprising the following steps:
 a) electromagnetic coupling between a coil of the transceiver and the double coil, and
 b) electromagnetic coupling between the double coil and the external receiving unit for transmitting data to the receiving unit and/or receiving data from the receiving unit.

16. The method according to claim 15, wherein the receiving unit is positioned above the transmission region outside the housing for transmitting and/or receiving data.

17. The method according to claim 15, wherein in step a) the electromagnetic coupling is between a coil of the transceiver and an inner coil assembly of the double coil.

18. The method according to claim 15, wherein in step b) the electromagnetic coupling is between an outer coil assembly of the double coil and the external receiving unit.

* * * * *